US012663773B2

(12) United States Patent (10) Patent No.: US 12,663,773 B2
Brecht et al. (45) Date of Patent: Jun. 23, 2026

(54) AUTOMATION SYSTEM AND METHOD FOR OPERATING AN AUTOMATION SYSTEM

(71) Applicant: SEW-EURODRIVE GMBH & CO. KG, Bruchsal (DE)

(72) Inventors: Roland Brecht, Karlsbad (DE); Freddy Heinzelmann, Bruchsal (DE); Claus Beaury, Munich (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 369 days.

(21) Appl. No.: 18/553,910

(22) PCT Filed: Mar. 22, 2022

(86) PCT No.: PCT/EP2022/057518
§ 371 (c)(1),
(2) Date: Oct. 4, 2023

(87) PCT Pub. No.: WO2022/214310
PCT Pub. Date: Oct. 13, 2022

(65) Prior Publication Data
US 2024/0369984 A1 Nov. 7, 2024

(30) Foreign Application Priority Data
Apr. 7, 2021 (DE) .......................... 102021001792.7

(51) Int. Cl.
*G05B 19/00* (2006.01)
*G05B 19/042* (2006.01)

(52) U.S. Cl.
CPC .................... *G05B 19/0425* (2013.01); *G05B 2219/25428* (2013.01)

(58) Field of Classification Search
CPC ...... G05B 19/0425; G05B 2219/25428; G05B 19/0421; G05B 19/00; Y02P 90/02
(Continued)

(56) References Cited

U.S. PATENT DOCUMENTS

| | | | |
|---|---|---|---|
| 10,795,849 B2 | 10/2020 | Norenburg | |
| 11,281,181 B2 | 3/2022 | Scherrer | |
| 2009/0248384 A1* | 10/2009 | Gienke | G05B 19/0423 |
| | | | 710/305 |

FOREIGN PATENT DOCUMENTS

| | | |
|---|---|---|
| DE | 10249846 A1 | 5/2004 |
| DE | 102011086726 B4 | 4/2014 |

(Continued)

OTHER PUBLICATIONS

International Report on Patentability issued in corresponding International Application No. PCT/EP2022/057518 dated Oct. 10, 2023, pp. 1-8, English Translation.

(Continued)

*Primary Examiner* — Shardul D Patel

(74) *Attorney, Agent, or Firm* — Carter, DeLuca & Farrell LLP

(57) ABSTRACT

An automation system includes a control device, a system bus, a first field device, and a second field device. The control device includes a system bus interface for communication with the field devices by the system bus, and each field device includes a data interface for communication by the system bus. Each field device includes a monitoring input for receiving a monitoring signal and a monitoring output for outputting a monitoring signal. The monitoring input of the first field device is coupled to the monitoring output of the second field device by the system bus, and the monitoring input of the second field device is coupled to the monitoring output of the first field device by the system bus.

17 Claims, 1 Drawing Sheet

(58) Field of Classification Search
USPC ............................................. 701/79; 700/79
See application file for complete search history.

(56) References Cited

FOREIGN PATENT DOCUMENTS

| DE | 102017005768 A1 | 1/2018 | | |
| DE | 102017123615 A1 | 4/2019 | | |
| DE | 102019207790 A1 | 12/2020 | | |
| EP | 2210325 B1 * | 4/2017 | .............. | H02H 3/05 |
| EP | 3240370 A1 | 11/2017 | | |
| EP | 3215899 B1 | 7/2019 | | |
| WO | 2009/062535 A1 | 5/2009 | | |
| WO | 2020018335 A1 | 1/2020 | | |

OTHER PUBLICATIONS

International Search Report issued in corresponding International Application No. PCT/EP2022/057518 dated Jul. 7, 2022, pp. 1-2, English Translation.

* cited by examiner

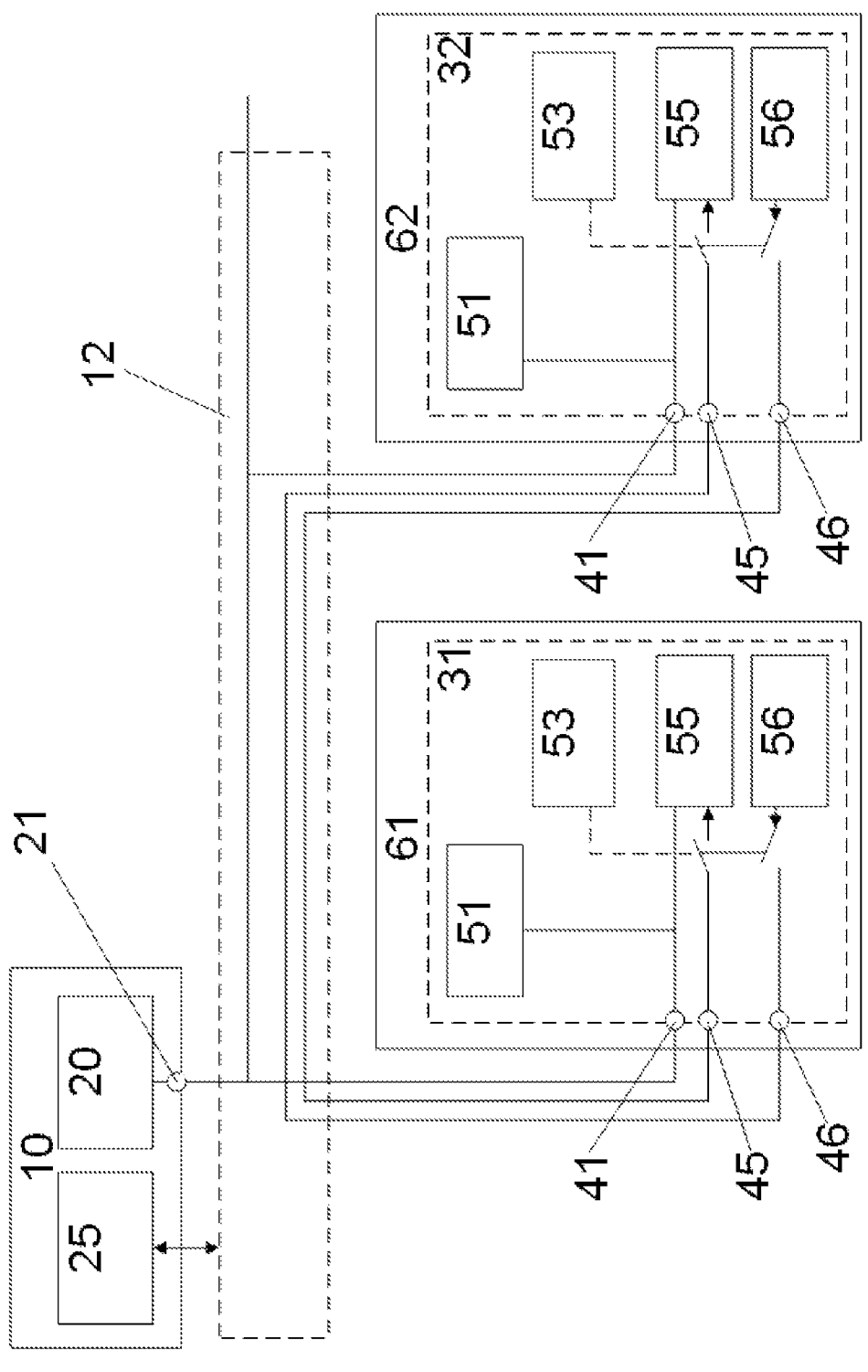

AUTOMATION SYSTEM AND METHOD FOR OPERATING AN AUTOMATION SYSTEM

FIELD OF THE INVENTION

The present invention relates to an automation system, e.g., including at least one control device, a system bus, and at least a first field device and a second field device. The present invention also relates to a method for operating an automation system.

BACKGROUND INFORMATION

A system of automation components and an associated operating method are described in German Patent Document No. 10 2017 005 768. The system has a control unit which includes a memory area which includes a parameter data set.

European Patent Document No. 3 215 899 describes a method for operating an industrial plant that includes a control system. The control system has a controller and an inverter, which is connected to the controller for data exchange.

German Patent Document No 10 2011 086 726 describes an automation system that includes a control system server, a control device, and a field device. The control device and the field device communicate by a fieldbus network, while the control system server and the control device communicate by a control network.

A safety-relevant plant with a plurality of plant components is described in German Patent Document No. 10 2019 207 790. The communication interfaces of the plant components are connected to each other by a communication line.

A safety module for a programmable logic controller is described in German Patent Document No. 10 2017 123 615. The safety module has several modules that are connected by an internal bus.

A device for observing events is described in European Patent Document No. 3 240 370. The device includes a network interface for coupling to a bus.

An automation system having a plurality of field devices is described in PCT Patent Document No. WO 2020/018335. A field device is selected as the master.

SUMMARY

Example embodiments of the present invention provide an automation system and a method for operating an automation system.

An automation system, according to example embodiments of the present invention, includes at least one control device, a system bus, and at least a first field device and a second field device. The control device has a system bus interface for communicating with the field devices by the system bus, and the field devices each have a data interface for communicating by the system bus. The field devices each have a monitoring input for receiving a monitoring signal and a monitoring output for outputting a monitoring signal. The monitoring input of the first field device is coupled to the monitoring output of the second field device by the system bus, and the monitoring input of the second field device is coupled to the monitoring output of the first field device by the system bus.

The field devices, which are normally configured as slave in the automation system, are thus able to communicate directly with each other by the fieldbus. Indirect communication by the control device, which is normally configured as the master, is not required. Data as well as monitoring signals can be exchanged directly between the field devices. The configuration of the automation system allows each field device to simulate a master for another field device. It is thus possible to operate field devices in the automation system, in which no master is required.

According to example embodiments, each of the field devices is arranged as a safety assembly. The automation system can thus be used in safety-relevant applications. For example, the functional safety of the automation system must be ensured, for example, in accordance with the standards EN ISO 13849 "Safety of machinery—Safety-related parts of control systems" and EN/IEC 61508 "Functional safety of safety-related electrical/electronic/programmable electronic systems". For example, no safety protocol master is required. Safety protocol masters are relatively expensive; so there is a significant cost saving. Data can be transferred using a safety protocol based on the black-channel principle.

According to example embodiments, the control device has a control unit for controlling the field devices. The control unit is configured to send control data to the field devices by the system bus interface. The control unit is arranged as a virtual non-safe protocol host (VNSPH) and is configured to control the field devices, e.g., the communication of the field devices by the system bus. The control data includes, for example, status signals, control signals, and process data.

According to example embodiments, the control device has a routing unit configured to couple the monitoring input of the first field device to the monitoring output of the second field device, and to couple the monitoring input of the second field device to the monitoring output of the first field device. The routing unit is arranged as a Nonsafe-Black-Channel-Router (NBCR) and is adapted to configure the system bus and to control a data exchange by the system bus.

According to example embodiments, the first field device is configured to send data to the second field device by the data interface, and the second field device is configured to send data to the first field device by the data interface. This means that data can be transferred directly between the first field device and the second field device according to the black-channel principle, bypassing a master.

According to example embodiments, each of the field devices includes a configuration unit configured to switch the respective field device to a parallel operating mode or to a slave operating mode in dependence on configuration data. A field device switched to parallel operating mode outputs a monitoring signal by the monitoring output and receives a monitoring signal by the monitoring input. A field device switched to slave operating mode outputs a monitoring signal by the data interface and receives a monitoring signal by the data interface. The monitoring signal output by the data interface is transmitted to the control device, e.g., to the control unit, by the system bus. The monitoring signal received by the data interface is transmitted to the respective field device by the control device, e.g., by the control unit, by the system bus. The field devices can thus be operated in a parallel operating mode in the automation system. The field devices can alternatively be operated in slave operating mode in a conventional automation system with a master.

According to example embodiments, the control device is adapted to send configuration data to the field devices by the system bus. The configuration units of the field devices are configured to switch the respective field device to parallel operating mode or slave operating mode in dependence on the configuration data sent by the control device. Thus, a central switching of the field devices into the different operating modes is possible. For example, the field devices can be operated in parallel operating mode as long as there is no master in the automation system. If a master is included in the automation system, the field devices can be operated in slave operating mode after a central switching.

According to example embodiments, each of the field devices includes an output unit which is configured to generate a monitoring signal and to output it by the monitoring output. By outputting the monitoring signal, a field device simulates a monitoring signal from a master which is received by another field device. The monitoring signal output by the monitoring output also includes, for example, a connection ID.

According to example embodiments, each of the field devices includes an input unit adapted to receive a monitoring signal by the monitoring input and to validate it. The field device receives by the monitoring input, for example, a monitoring signal generated and output by another field device. The monitoring signal received by the monitoring input also includes, for example, a connection ID. The input unit validates, for example, the connection ID.

According to example embodiments, each of the field devices includes a data unit adapted to output data by the data interface and to receive data by the data interface.

According to example embodiments of the present invention, in a method for operating an automation system, a monitoring signal is output by the first field device, a monitoring signal is received by the second field device, a monitoring signal is output by the second field device, and a monitoring signal is received by the first field device.

According to example embodiments of the present invention, in a method for operating an automation system, a monitoring signal is output by the monitoring output of the first field device, which is received by the monitoring input of the second field device, and a monitoring signal is output by the monitoring output of the second field device, which is received by the monitoring input of the first field device. Thus, one field device simulates a master for another field device. The method described herein thus makes it possible to operate field devices in the automation system, in which no master is required.

According to example embodiments, data is sent by the first field device to the second field device by the data interface, and data is sent by the second field device to the first field device by the data interface. This means that data is transferred directly between the first field device and the second field device according to the black-channel principle, bypassing a master.

According to example embodiments, the respective field device is switched to a parallel operating mode or to a slave operating mode in dependence on configuration data. A monitoring signal is output by the monitoring output by a field device switched to parallel operating mode, and a monitoring signal is received by the monitoring input. A monitoring signal is output by the data interface by a field device switched to slave operating mode, and a monitoring signal is received by the data interface. The field devices are switched to a parallel operating mode for operation in the automation system. Alternatively, the field devices are switched to a slave operating mode for operation in a conventional automation system with a master.

Further features and aspects of example embodiments of the present invention are described in more detail below with reference to the appended schematic Figure

BRIEF DESCRIPTION OF THE DRAWING

FIG. 1 schematically illustrates an automation system.

DETAILED DESCRIPTION

FIG. 1 schematically illustrates an automation system. The automation system includes a control device 10, a system bus 12, a first field device 31, and a second field device 32. The system bus 12 is arranged as an EtherCat, for example. The system bus 12 makes it possible to transmit data using a safety protocol based on the Black-Channel principle.

The control device 10 has a system bus interface 21 for communicating with the field devices 31, 32 by the system bus 12. The control device 10 also has a routing unit 25 for managing the system bus 12. The control device 10 further has a control unit 20 for controlling the field devices 31, 32. During operation of the automation system, the control unit 20 sends control data to the field devices 31, 32 by the system bus interface 21 and the system bus 12.

For example, the automation system includes a first drive unit 61 and a second drive unit 62. The drive units 61, 62 are, for example, frequency converters or input/output units. The first drive unit 61 includes the first field device 31, and the second drive unit 62 includes the second field device 32. The field devices 31, 32 each have a data interface 41 for communication by the system bus 12. The field devices 31, 32 each also have a monitoring input 45 for receiving a monitoring signal and a monitoring output 46 for outputting a monitoring signal.

The field devices 31, 32 can each be operated in a parallel operating mode as well as in a slave operating mode. The field devices 31, 32 each have a configuration unit 53 for this purpose. In dependence on configuration data, the respective field device 31, 32 is switched by the configuration unit 53 to the parallel operating mode or to the slave operating mode.

A field device 31, 32 switched to slave operating mode communicates exclusively with the control device 10, e.g., with the control unit 20, by the system bus 12. A field device 31, 32 switched to slave operating mode transmits data to the control device 10, e.g., to the control unit 20, by the data interface 41 and the system bus 12. A field device 31, 32 switched to slave operating mode also receives data by the data interface 41, which is transmitted to the respective field device 31, 32 by the control device 10, e.g., by the control unit 20, by the system bus 12.

A field device 31, 32 switched to slave operating mode outputs a monitoring signal by the data interface 41. The monitoring signal is thus transmitted to the control device 10, e.g., to the control unit 20, by the system bus 12. A field device 31, 32 switched to slave operating mode also receives a monitoring signal by the data interface 41. The monitoring signal is thus transmitted to the respective field device 31, 32 by the control device 10, e.g., by the control unit 20, by the system bus 12.

A field device 31, 32 switched to parallel operating mode communicates with the respective other field device 31, 32 by the system bus 12. For example, the two field devices 31, 32 are switched to parallel operating mode. Thus, the first field device 31 communicates with the second field device 32.

The first field device 31, which is switched to parallel operating mode, transmits data to the second field device 32 by the data interface 41 and the system bus 12. The second field device 32 receives, by the data interface 41, data transmitted by the first field device 31 to the second field device 32 by the system bus 12.

The second field device 32, which is switched to parallel operating mode, transmits data to the first field device 31 by the data interface 41 and the system bus 12. The first field device 31 receives, by the data interface 41, data transmitted by the second field device 32 to the first field device 31 by the system bus 12.

The first field device 31, which is switched to parallel operating mode, outputs a monitoring signal by the monitoring output 46 and the system bus 12, which is received by the monitoring input 45 of the second field device 32. The second field device 32, which is switched to parallel operating mode, outputs a monitoring signal by the monitoring output 46 and the system bus 12, which is received by the monitoring input 45 of the first field device 31.

For this purpose, the monitoring input 45 of the first field device 31 is coupled to the monitoring output 46 of the second field device 32 by the system bus 12. The monitoring input 45 of the first field device 31 is thus coupled to the monitoring output 46 of the second field device 32 by the routing unit 25.

Similarly, the monitoring input 45 of the second field device 32 is coupled to the monitoring output 46 of the first field device 31 by the system bus 12. The monitoring input 45 of the second field device 32 is also coupled to the monitoring output 46 of the first field device 31 by the routing unit 25.

The field devices 31, 32 each have an output unit 56 and an input unit 55. When the respective field device 31, 32 is switched to parallel operating mode by the configuration unit 53, the output unit 56 is connected to the monitoring output 46, and the input unit 55 is connected to the monitoring input 45. This is symbolically represented by switches controlled by the configuration unit 53.

With a field device 31, 32 switched to parallel operating mode, the output unit 56 generates the monitoring signal and outputs it by the monitoring output 46. The monitoring signal also includes a connection ID. With a field device 31, 32 switched to parallel operating mode, the input unit 55 receives the monitoring signal by the monitoring input 45 and validates it. The input unit 55 validates, e.g., the connection ID.

When the respective field device 31, 32 is switched to slave operating mode by the configuration unit 53, the output unit 56 is disconnected from the monitoring output 46, and the input unit 55 is disconnected from the monitoring input 45. As already mentioned, this is symbolically represented by the switches controlled by the configuration unit 53.

The field devices 31, 32 each also have a data unit 51. The data unit 51 outputs data by the data interface 41 and receives data by the data interface 41.

A field device 31, 32 switched to slave operating mode transmits data to the control device 10 by the data interface 41 and receives data from the control device 10 by the data interface 41. A field device 31, 32 switched to parallel operating mode transmits data to the respective other field device 31, 32 by the data interface 41 and receives data from the respective other field device 31, 32 by the data interface 41.

LIST OF REFERENCE NUMERALS

10 Control device
12 System bus
20 Control unit
21 System bus interface

25 Routing unit
31 First field device
32 Second field device
41 Data interface
45 Monitoring input
46 Monitoring output
51 Data unit
53 Configuration unit
55 Input unit
56 Output unit
61 First drive unit
62 Second drive unit

The invention claimed is:

1. An automation system, comprising:
a system bus;
a first field device;
a second field device; and
a control device including a system bus interface adapted to communicate with the field devices via the system bus;
wherein each field device includes a data interface adapted to communicate via the system bus;
wherein field device includes a monitoring input adapted to receive a monitoring signal and a monitoring output adapted to output a monitoring signal;
wherein the monitoring input of the first field device is coupled to the monitoring output of the second field device by the system bus;
wherein the monitoring input of the second field device is coupled to the monitoring output of the first field device by the system bus; and
wherein each field device includes a configuration unit adapted to switch the field device to a parallel operating mode or to a slave operating mode in dependence on configuration data, a field device in the parallel operating mode adapted to output a monitoring signal by the monitoring output and to receive a monitoring signal by the monitoring input, a field device in the slave operating mode adapted to output a monitoring signal by the data interface and to receive a monitoring signal by the data interface.

2. The system according to claim 1, wherein each field device is arranged as a safety assembly.

3. The system according to claim 1, wherein the control device includes a controller unit adapted to control the field devices, the controller adapted to send control data to the field devices by the system bus interface.

4. The system according to claim 1, wherein the control device includes a routing unit adapted to couple the monitoring input of the first field device to the monitoring output of the second field device and to couple the monitoring input of the second field device to the monitoring output of the first field device.

5. The system according to claim 1, wherein the first field device is adapted to send data to the second field device by the data interface, and the second field device is adapted to send data to the first field device by the data interface.

6. The system according to claim 1, wherein the control device is adapted to send configuration data to the field devices via the system bus, and configuration unit of the field device is adapted to switch the field device to the parallel operating mode or slave operating mode in dependence on the configuration data sent by the control device.

7. The system according to claim 1, wherein each field device includes an output unit adapted to generate a monitoring signal and to output the monitoring signal by the monitoring output.

8. The system according to claim 1, wherein each field device includes an input unit adapted to receive a monitoring signal by the monitoring input and to validate the monitoring signal.

9. The system according to claim 1, wherein each field device includes a data unit adapted to output data by the data interface and to receive data by the data interface.

10. A method for operating an automation system as recited in claim 1, comprising:

outputting a monitoring signal by the first field device;

receiving by the second field device the monitoring signal output by the first field device;

outputting a monitoring signal by the second field device; and receiving by the first field device the monitoring signal output by the first field device.

11. The method according to claim 10, wherein a monitoring signal output by the monitoring output of the first field device is received by the monitoring input of the second field device, and a monitoring signal output by the monitoring output of the second field device is received by the monitoring input of the first field device.

12. The method according to claim 10, wherein data is sent by the first field device to the second field device by the data interface, and data is sent by the second field device to the first field device by the data interface.

13. The method according to claim 10, wherein each field device is switched to a parallel operating mode or to a slave operating mode in dependence on configuration data;

wherein a monitoring signal output by the monitoring output by a field device in the parallel operating mode is received by the monitoring input; and wherein a monitoring signal output by the data interface by a field device in the slave operating mode is received by the data interface.

14. The system according to claim 1, wherein each field device includes an output unit adapted to generate a monitoring signal of a master device to simulate the monitoring signal of the master device and to output the monitoring signal by the monitoring output.

15. The method according to claim 10, wherein each field device includes an output unit adapted to generate a monitoring signal of a master device to simulate the monitoring signal of the master device and to output the monitoring signal by the monitoring output.

16. The method according to claim 10, wherein the monitoring signal generated by the first field device and received by the second field device corresponds to a monitoring signal of a master device to simulate, to the second field device, the first field device as the master device.

17. The method according to claim 15, wherein the monitoring signal generated by the first field device and received by the second field device corresponds to a monitoring signal of a master device to simulate, to the second field device, the first field device as the master device.

* * * * *